United States Patent
Kocks et al.

[11] Patent Number: 5,944,826
[45] Date of Patent: Aug. 31, 1999

[54] INTEGRATED CIRCUIT LAYOUT COMPLETE WITH A BUS LOGIC UNIT CONNECTED TO A DATA BUS WITH POWER REDUCTION CIRCUITRY

[75] Inventors: Michael Kocks; Gerald Krimmer, both of Heilbronn, Germany

[73] Assignee: Temic Telefunken Microelectronic GmbH, Heilbronn, Germany

[21] Appl. No.: 08/805,067

[22] Filed: Feb. 25, 1997

[30] Foreign Application Priority Data

Mar. 7, 1996 [DE] Germany ............... 196 08 776

[51] Int. Cl.[6] ..................................................... G06F 1/32
[52] U.S. Cl. ............................................. 713/320; 713/300
[58] Field of Search ................ 395/750.03, 750.04, 395/750.05, 750.06; 364/707; 370/311; 327/544; 713/300, 320, 322, 323, 324

[56] References Cited

U.S. PATENT DOCUMENTS

| | | | |
|---|---|---|---|
| 4,841,440 | 6/1989 | Yonezu et al. | 395/750.04 |
| 4,843,341 | 6/1989 | Hosticka et al. | 330/253 |
| 4,851,987 | 7/1989 | Day | 395/750.04 |
| 4,959,621 | 9/1990 | Hosticka et al. | 330/253 |
| 5,025,387 | 6/1991 | Frane | 395/750.04 |
| 5,404,544 | 4/1995 | Crayford . | |
| 5,457,801 | 10/1995 | Aihara | 364/707 |
| 5,666,355 | 9/1997 | Huah et al. | 370/311 |
| 5,734,618 | 3/1998 | Mizuta | 365/229 |

FOREIGN PATENT DOCUMENTS 4401410  7/1995  Germany .

OTHER PUBLICATIONS

Datenblatt zu 82526 Serial Communications; Controller Architectural Overview, Intel Corp. Jan. 1989, pp. 1–34.

*Primary Examiner*—Ayaz R. Sheikh
*Assistant Examiner*—Xuan M. Thai
*Attorney, Agent, or Firm*—Venable; Norman N. Kunitz

[57] ABSTRACT

An integrated circuit layout complete with a bus logic unit connected to a data bus. The data bus includes at least one activation line for an activation signal, making it possible—via the data bus—to activate the bus logic unit for data transmission. A controllable power supply unit is provided with a control input connected to the activation line and serves to feed an operating current to the bus logic unit. The operating current is reduced by the activation signal when the bus logic unit is deactivated.

3 Claims, 1 Drawing Sheet

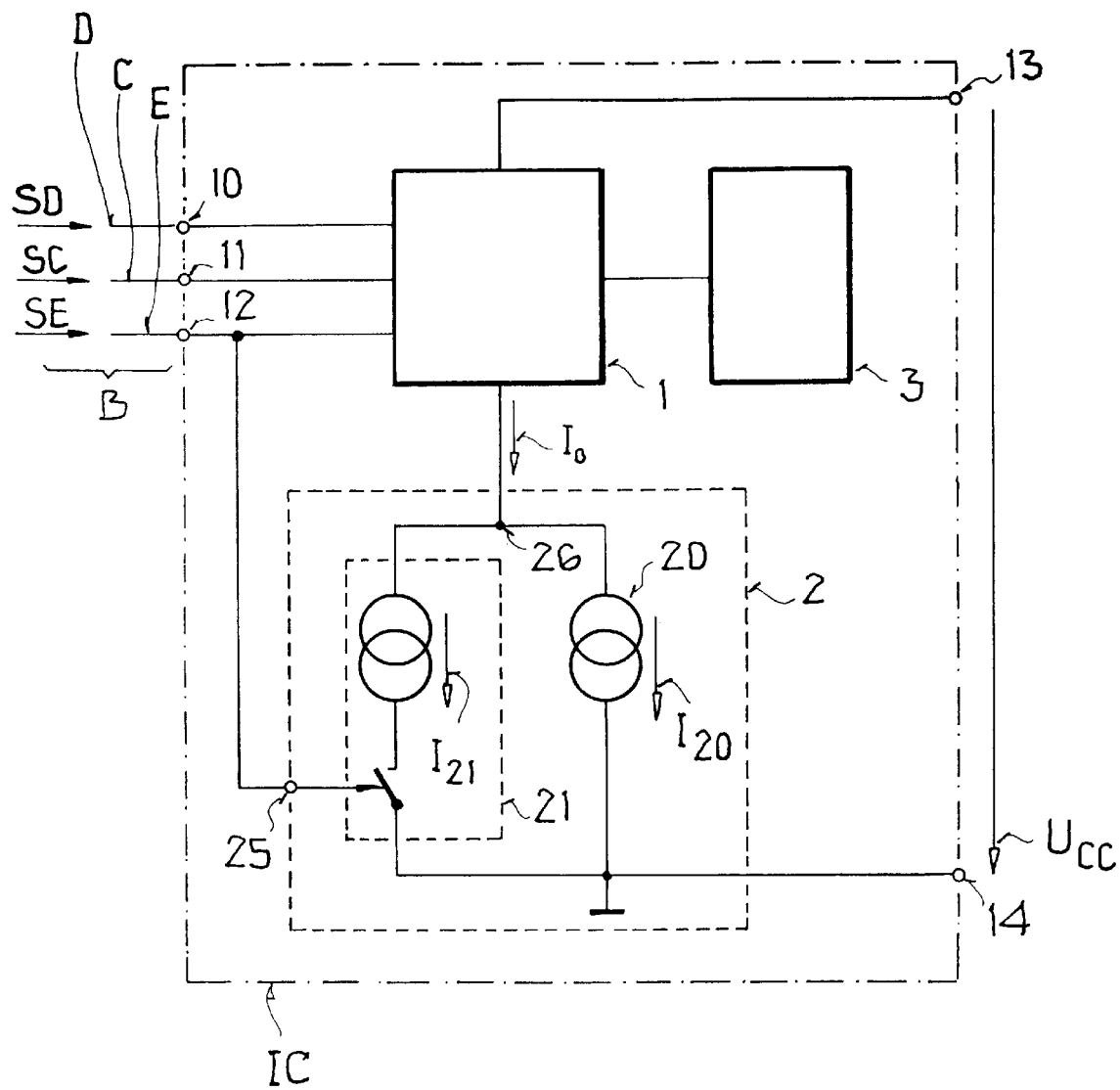
FIG.

INTEGRATED CIRCUIT LAYOUT COMPLETE WITH A BUS LOGIC UNIT CONNECTED TO A DATA BUS WITH POWER REDUCTION CIRCUITRY

BACKGROUND OF THE INVENTION

The invention concerns an integrated circuit layout complete with a bus logic unit connected to a data bus, with the bus having at least one activation line for an activation signal, making it possible to activate the bus logic unit via the data bus.

Such a circuit layout is known from German published Patent Application P 44 01 410.4. The integrated circuit layout (IC) described therein features a bus logic unit which can be activated for data transmission via an activation signal which is applied to an activation line of a data bus, that is, the IC can be addressed either as a data source or a data destination by the activation signal. The bus logic unit is used to evaluate data transmitted to the IC, store such data, and control analog or digital IC functions in accordance with such stored data.

The principal disadvantage of this circuit layout is its high power consumption which has a detrimental effect on the ready status of the circuit layout, in particular if this circuit layout is supplied by a battery source.

SUMMARY OF THE INVENTION

The invention is based on the task of providing an integrated circuit layout of the type initially mentioned above whose average power consumption is low and which can be easily manufactured at low cost.

This task is solved according to the present invention by an integrated circuit layout complete with a bus logic unit connected to a data bus, with the bus having at least one activation line for an activation signal, making it possible to activate the bus logic unit via the data bus, and wherein a controllable power supply unit, having a control input connected to the activation line, is provided to supply an operating current to the bus logic unit, and the controllable power supply unit is responsive to the activation signal to reduce the operating current when the bus logic unit is deactivated. Further advantageous applications and developments result from the disclosure.

According to the invention, a controllable power supply unit is provided for supplying operating power to the bus logic unit which features a control input connected to the activation line of a data bus preferably designed as a three-wire bus. With the bus logic unit deactivated, the operating current flowing through the bus logic unit will be reduced by the activation signal applied to the activation line. Thus, this operating current will be reduced during breaks in transmission, that is, in time intervals where no data are transmitted; therefore, the operating current will be high during data transmission only, that is, whenever the bus logic unit is activated for data transmission. This reduction in operating current also reduces the average power consumption of the circuit layout. For low data throughputs in particular, a considerable reduction in average power consumption will then be obtained. As the operating current can be varied via the activation line, no additional line—and thus no additional terminals on the circuit layout housing—will be required for controlling the operating current; the circuit layout can thus be manufactured at low cost.

The controllable power supply unit preferably features a quiescent current source as well as a current source which is switchable via the control input. Both current sources are connected in parallel to each other and supply, respectively, a first or second partial current. The operating current is comprised of both partial currents and will thus be increased or reduced by the value of the second partial current whenever the switchable power source is turned on or off.

The circuit layout according to this invention can be used in a large number of different electronic devices and equipments, e.g. in telecommunications equipment or in consumer electronics equipment. Due to its low power consumption it is particularly suitable for use in battery—or accumulator-operated equipment.

BRIEF DESCRIPTION OF THE DRAWING

The FIGURE is a block circuit diagram of a preferred embodiment of the invention.

DESCRIPTION OF THE PREFERRED EMBODIMENTS

This invention will be described in some detail below, using an embodiment displayed as a block diagram shown in the FIGURE attached. According to this FIGURE, the integrated circuit layout IC comprises a data terminal 10, a clock cycle terminal 11, an activation terminal 12, and two supply terminals 13 and 14 which are fed with the supply voltage $U_{cc}$. Data line D, clock cycle line C, and activation line E, all lines being of data bus B which is designed as a three-wire bus, are connected via data terminal 10 or clock cycle terminal 11 or the activation terminal 12 with bus logic unit 1 designed, e.g., as an I$^2$L logic circuit, one power supply terminal 13 is connected via bus logic unit 1 with the controllable power supply unit 2, and via this latter unit, is also connected to the other power supply terminal 14. By means of bus logic unit 1, data transmission, that is, the receipt of data from data bus B or the transmission of data to data bus B, as well as storage of the data in selectable memory cells of bus logic unit 1, will be controlled. The controllable power supply unit 2 is intended to control the operating current $I_0$ supplied to the bus logic unit 1 for energy supply purposes. The controllable power supply unit 2 including a quiescent current source 20 as well as a switchable current source 21 which is connected in parallel with the source 20 and which can be turned on and off via control input 25 of the controllable power supply unit 21 and with control input 25 being connected in its turn with activation line E (via activation terminal 12). The two power sources 20 and 21, respectively, supply a first partial current $I_{20}$ or a second partial current $I_{21}$ which are combined at a summation node 26 connected to the bus logic unit 1, and summed up to form the operating current $I_0$.

During data transmission, the data are fed to data line D as a serial sequence of data bits SD. The clock cycle line C is fed the periodic clock cycle signal SC for synchronizing the data bits SD, and the activation line E is fed the activation signal SE which activates the bus logic unit 1 for data transmission. At the same time that the bus logic unit 1 is activated, the switchable current source 21 will be turned on by activation signal SE which remains unchanged during data transmission; this increases operating current $I_0$ by the value of the second partial current $I_{21}$. At this operating current $I_0$, the bus logic unit 1 will be fully functional and thus capable of monitoring a bus protocol—according to which data are transmitted via the data bus—as well as processing and storing the data in memory cells of bus logic unit 1.

When data transmission has been completed, bus logic unit 1 will be deactivated by means of the activation signal SE, and data bus B will be released for further circuit layouts not shown in this FIGURE. The activation signal SE will also turn off the switchable current source 21, and this will reduce the operating current $I_0$ down to the value of the first partial current $I_{20}$ supplied by the quiescent current source 20. At this value of the operating current $I_0$, bus logic unit 1 will no longer be fully functional; however, the operating current $I_0$ suffices to maintain the data stored in the memory cells of bus logic unit 1. Therefore, various functions of function unit 3 that are controlled by the stored data remain controllable even after data transmission has been completed, that is, even when bus logic unit 1 has been deactivated.

The reduction of operating current $I_0$ reduces the average power consumption of circuit layout IC, with this reduction being greater the shorter the actual transmission times, and the longer the transmission breaks.

In the present embodiment, bus logic unit 1 of circuit layout IC is connected with a serial data bus B designed as a three-wire bus. However, it is possible to conceive of a circuit layout IC whose bus logic unit 1 is connected to a parallel data bus B featuring an activation line E as well as several data lines.

What is claimed is:

1. Integrated circuit layout (IC) complete with a bus logic unit (1) connected to a data bus (B), with the data bus (B) having at least one activation line (E) for an activation signal (SE), making it possible, via the data bus (B), to activate the bus logic unit (1) for data transmission, and wherein: a controllable power supply unit (2), having a control input (25) connected to the activation line (E), is provided for feeding an operating current ($I_0$) into the bus logic unit (1), and the operating current ($I_0$) is reduced by the activation signal (SE) when the bus logic unit (1) is deactivated.

2. Circuit layout according to claim 1 wherein the data bus (B) is a three wire bus additionally having a data line (D) for data and a clock cycle line (C) for a periodic clock signal (SC).

3. Circuit layout according to claim 1 wherein the controllable power supply unit (2) for generating the operating current ($I_0$) includes a quiescent current source (20), and a current source (21), which is switchable via the control input (25), connected in parallel with the quiescent current source (20), and turned on when the bus logic unit (1) is activated.

* * * * *